Oct. 26, 1954

L. H. SANDEN 2,692,968

ELECTRIC REGULATOR UTILIZING A SATURABLE
REACTOR WITH POSITIVE FEEDBACK

Filed April 2, 1951

Inventor
Lloyd H. Sanden
by Walter S. Madden Jr.
Attorney

Patented Oct. 26, 1954

2,692,968

UNITED STATES PATENT OFFICE 2,692,968

ELECTRIC REGULATOR UTILIZING A SATURABLE REACTOR WITH POSITIVE FEEDBACK

Lloyd H. Sanden, Milwaukee, Wis., assignor to Allis-Chalmers Manufacturing Company, Milwaukee, Wis.

Application April 2, 1951, Serial No. 218,737

7 Claims. (Cl. 322—28)

This invention relates in general to electric regulating systems and in particular to means for increasing the sensitivity of such systems.

Regulating systems which utilize a movable element, such as a torque motor or a solenoid, as the condition responsive means responsive to variations in the regulated condition have the disadvantage that a considerable change in the regulated condition is required to produce a substantial correcting torque in the element. That is, the correcting torque per unit change of the regulated condition is small, so that the system does not respond to variations in the regulated condition as rapidly as is desired.

This disadvantage may be overcome by providing the system with means which amplify the effects on the movable element of variations in the regulated condition, so that relatively small variations in the regulated condition produce a substantial correcting torque in the movable element.

It is therefore an object of the present invention to provide an electric regulating system having improved means for sensing deviations in the regulated condition.

It is an additional object of this invention to provide an electric regulating system having means for amplifying the effect on condition responsive means of variations in the regulated condition from a desired value.

It is a further object of this invention to provide an electric regulating system having improved sensitivity and accuracy.

Figure 1:
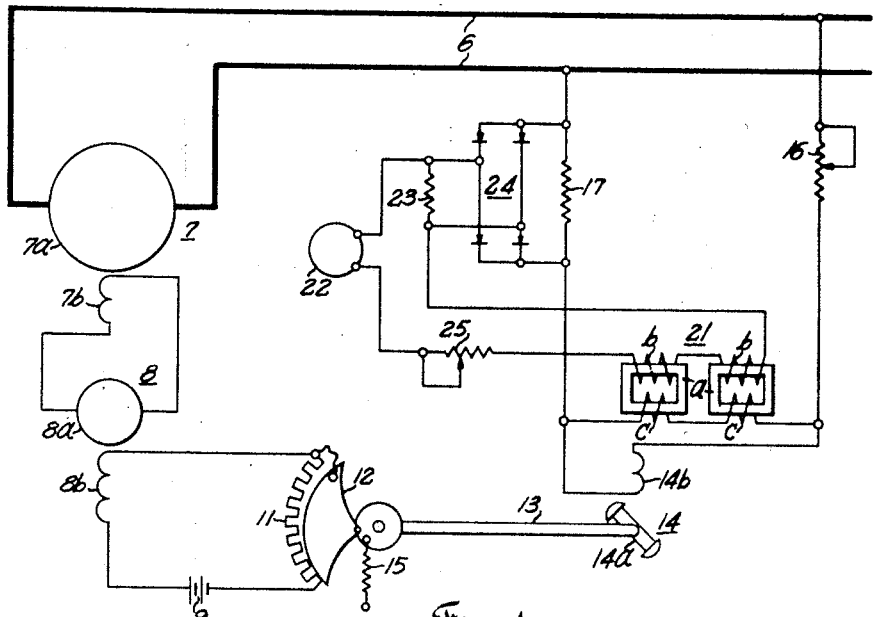
Figure 2:
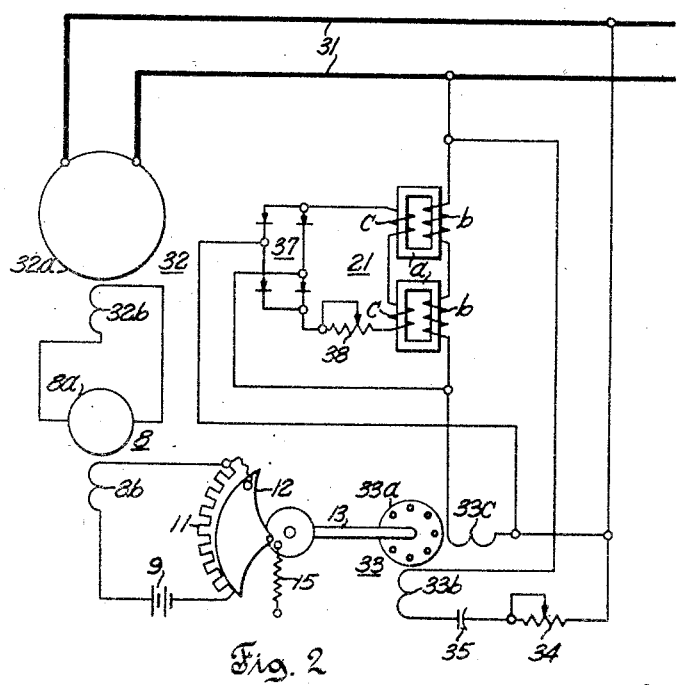

Objects and advantages other than those set forth above will be apparent from the following description when read in connection with the accompanying drawing, in which:

Fig. 1 diagrammatically illustrates the circuits and apparatus of the preferred form of this invention; and Fig. 2 diagrammatically illustrates the circuits and apparatus of an alternate embodiment of the invention.

As shown in Fig. 1, one embodiment of the invention is illustrated in connection with the regulation of an operating characteristic of an electric network represented by conductors 6. Conductors 6 are supplied with current from the armature 7a of a direct current generator 7 having a field winding 7b. Field winding 7b is energized from a suitable controllable source of direct current, such as the armature 8a of an exciter generator 8 having a field winding 8b. Field winding 8b is supplied with current from a battery 9 through an adjustable resistor 11. Resistor 11 has associated therewith a rocking contact sector 12 for varying the portion of resistor 11 which is connected in series with field winding 8b. Sector 12 may be connected through a shaft 13 to the rotor 14a of a torque motor 14 to be actuated in response to variations in the regulated condition. Motor 14 is provided with a field coil 14b producing in rotor 14a and shaft 13 a torque opposing the torque of a suitable reference, such as a spring 15, so that the direction and speed of rotation of motor 14 depends upon the direction and magnitude of variations in the voltage impressed on coil 14b from a predetermined value.

If it is desired to maintain the voltage of conductors 6 substantially constant at a desired value, field coil 14b is connected to conductors 6 in series with a pair of resistors 16, 17 to impress on coil 14b a voltage which is a measure of the voltage of conductors 6. A saturable reactor 21 having a pair of saturable cores 21a, a reactance winding 21b and a control winding 21c is provided to amplify the effect on motor 14 of variations in the voltage of conductors 6. Control winding 21c is connected in circuit with coil 14b, either in series therewith or in parallel therewith, to vary the saturation of reactor 21 in response to variations in the energization of coil 14b.

Reactance winding 21b is supplied with current from a suitable alternating current source, such as an alternator 22, through a resistor 23 to cause alternator 22 to impress on resistor 23 a voltage dependent upon the saturation of reactor 21. A suitable full wave rectifier 24 has its alternating current terminals connected to resistor 23 and has its direct current terminals connected to resistor 17 to impress across resistor 17 a unidirectional voltage which is a measure of the saturation of reactor 21. Rectifier 24 is so poled that the voltage across resistor 17 is of cumulative polarity with the voltage of conductors 6. An adjustable resistor 25 may be connected in series with source 22 and reactance winding 21b to adjust the voltage impressed on resistor 23.

The torque producing current in field coil 14b is caused to flow by the joint action of the signal voltage component impressed on coil 14b from conductors 6 and the feedback voltage component impressed on coil 14b from resistor 17. When the voltage of conductors 6 has the desired value, the sum of the above voltage components impressed on coil 14b is equal to the predetermined voltage to cause coil 14b to produce in rotor 14a and shaft 13 a torque equal and opposite to the torque exerted on shaft 13 by spring 15 so that shaft 13 maintains its given position.

Sector 12 likewise maintains its given position on resistor 11 to cause battery 9 to supply a predetermined excitation current to field winding 8b. This predetermined excitation current in field winding 8b is sufficient to produce in field winding 7b the current required to maintain the voltage of conductors 6 at the desired value.

If the voltage of conductors 6 increases above the desired value, the signal voltage component impressed on coil 14b from conductors 6 increases to increase the torque produced by coil 14b, to thereby rotate shaft 13 to actuate sector 12. This increase in the voltage across coil 14b increases the voltage across control winding 21c to increase the saturation of cores 21a and thereby increase the current through reactance winding 21b and resistor 23. This action causes the feedback voltage component impressed on resistor 17 from rectifier 24 to increase to further increase the voltage impressed across coil 14b. This action in turn further increases the saturation of cores 21a and thereby further increases the feedback voltage component. Sector 12 is rapidly moved to increase the amount of resistor 11 connected in series with field winding 8b to thereby return the voltage of conductors 6 to the desired value. Thus, the effect on motor 14 of the initial change in the signal voltage component is greatly amplified by reactor 21 to produce a considerable correcting torque in motor 14 in response to a relatively small change in the voltage of conductors 6.

If the voltage of conductors 6 decreases below the desired value, the action of the regulating system to amplify the effect of this decrease to return the voltage of conductors 6 to the desired value is the reverse of that described above.

Fig. 2 illustrates an alternate embodiment of the invention in connection with the regulation of an operating condition of an alternating current network represented by conductors 31. Conductors 31 are supplied with current from the armature 32a of an alternator 32 having a field winding 32b. Field winding 32b is supplied with excitation current from armature 8a of generator 8, and field winding 8b is connected in circuit with battery 9 and resistor 11 as in the embodiment of Fig. 1. Sector 12 and shaft 13 are actuated by movement of the rotor 33a of a split phase torque motor 33 having a pair of cooperating mechanically displaced field windings 33b, 33c connected to conductors 31 in parallel circuits. Coil 33b is connected in series with an adjustable resistor 34 for controlling the division of current between coils 33b, 33c. A capacitor 35 is preferably connected in series with coil 33b to thereby increase the motor torque. Spring 15 opposes the torque produced by motor 33 to cause the motor 33 to reach a position depending upon the magnitude of the currents in coils 33b, 33c. The reactance winding 21b of reactor 21 is connected in series with coil 33c across conductors 31, and control winding 21c of reactor 21 is connected in parallel with coil 33c through a suitable full wave rectifier 37 and an adjustable resistor 38 to vary the saturation of reactor 21 in response to variations in the energization of coil 33c.

In operation of the system, assuming that the voltage of conductors 31 has the desired value, the torque produced by motor 33 is equal and opposite to the torque of spring 15, so that shaft 13 does not rotate. Sector 12 therefore maintains its given position on resistor 11 to maintain the voltage of conductors 31 at the desired value. Under this condition, the current through control winding 21c saturates cores 21a to a predetermined extent to cause a predetermined division of the voltage of conductors 31' between reactance winding 21b and field coil 33c.

If the voltage of conductors 31 increases above the desired value, the voltage impressed on coils 33b, 33c increases to produce a rotational correcting torque in motor 33. This increase in the voltage across coil 33c increases the current through control winding 21c to increase the saturation of cores 21a and thereby reduce the voltage across reactance winding 21b. This reduction in the voltage of reactance winding 21b further increases the voltage across coil 33c to increase the torque of motor 33 and further increase the saturation of cores 21a. Thus, the effect on motor 33 of a small change in the voltage of conductors 6 is amplified by reactor 21 to produce a large corrective torque in motor 33 to cause sector 12 to increase the amount of resistor 11 connected in series with field winding 8b to return the voltage of conductors 31 to the desired value.

The operation of the regulating system to amplify the effect on motor 33 of a decrease in the voltage of conductors 31 from the desired value for returning the voltage to the desired value is the reverse of that described above.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. In a system for maintaining an operating condition of an electric network substantially constant, the combination of controlling means for varying said condition, a regulating device for varying the energization of said controlling means, said regulating device having an element for controlling said device, connections between said network and said element for impressing on said element a voltage which is a measure of said condition, a saturable reactor having a control winding and a reactance winding, means connecting said control winding in circuit with said element to vary the saturation of said reactor solely in response to variations in the value of the voltage across the terminals of said element, and means connecting said reactance winding in circuit with said element to vary the energization of said element in response to variations in the energization of said control winding.

2. In a system for maintaining an operating condition of an electric network substantially constant, the combination of controlling means for varying said condition, a movable regulating device for varying the energization of said controlling means, said regulating device having an actuating element for controlling the movement of said device, connections between said network and said element for impressing on said element a voltage which is a measure of said condition, a saturable reactor having a control winding and a reactance winding, means connecting said control winding in circuit with said element to vary the saturation of said reactor solely in response to variations in the value of the voltage across the terminals of said element, and means connecting said reactance winding in circuit with said element to vary the energization of said element in response to variations in the energization of said control winding.

3. In a system for maintaining the voltage of an electric network substantially constant, the combination of controlling means for varying said voltage, a motor for controlling the energization of said controlling means, said motor having a field coil for controlling said motor, means connecting said field coil to said network to impress on said field coil a voltage which is a measure of the voltage of said network, a saturable reactor having a control winding and a reactance winding, means connecting said control winding in parallel with said field coil to vary the saturation of said reactor solely in response to variations in the value of the voltage across the terminals of said field coil, means for supplying alternating current to said reactance winding, and means connecting said reactance winding in circuit with said field coil and said network to vary the energization of said field coil in response to variations in the energization of said control winding, whereby the effect on said field coil of variations in the voltage of said network is amplified by said reactor.

4. In a system for maintaining the voltage of a direct current network substantially constant at a desired value, the combination of controlling means for varying the voltage of said network, a torque motor having a field coil for controlling the energization of said controlling means, the direction and speed of rotation of said motor being determined by the direction and magnitude of variations in the voltage impressed on said field coil from a predetermined value, means connecting said field coil to said network to impress on said field coil a signal voltage component proportional to the voltage of said network, a saturable reactor having a control winding and a reactance winding, means connecting said control winding in parallel with said field coil to vary the saturation of said reactor solely in response to variations in the value of the voltage across the terminals of said field coil, a source of alternating current for supplying said reactance winding, and means including rectifier means connecting said reactance winding in circuit with said field coil and said network to impress on said coil a feedback voltage component which is a measure of the energization of said control winding, the sum of said feedback and said signal voltage components being equal to said predetermined voltage when the voltage of said network has said desired value, whereby the effect on said motor of variations in the voltage of said network from said desired value is amplified by said reactor.

5. In a system for maintaining the voltage of a direct current network substantially constant at a desired value, the combination of a dynamoelectric machine for varying the voltage of said network, said machine having an armature winding and field winding means, a torque motor having a field coil for controlling the energization of said field winding means, the direction and speed of rotation of said motor being determined by the direction and magnitude of variations in the voltage impressed on said field coil from a predetermined value, means connecting said field coil to said network to impress on said field coil a signal voltage component proportional to the voltage of said network, a saturable reactor having a control winding and a reactance winding, means connecting said control winding in parallel with said field coil to vary the saturation of said reactor solely in response to variations in the value of the voltage across the terminals of said field coil, a source of alternating current for supplying said reactance winding, and means including rectifier means connecting said reactance winding in circuit with said field coil and said network to impress on said field coil a feedback voltage component which is a measure of the energization of said control winding, the sum of said feedback and said signal voltage components being equal to said predetermined voltage when the voltage of said network has said desired value, whereby the effect on said motor of variations in the voltage of said network from said desired value is amplified by said reactor.

6. In a system for maintaining the voltage of an alternating current network at a desired value, the combination of controlling means for varying said voltage, a rotatable torque motor for controlling the energization of said controlling means, said motor having a pair of cooperating field coils for controlling the rotation of said motor, means connecting said field coils across said network to impress on said field coils voltages proportional to the voltage of said network, a saturable reactor having a control winding and a reactance winding, means connecting said control winding in parallel with one of said field coils to vary the saturation of said reactor solely in response to variations in the value of the voltage across the terminals of said one field coil, and means connecting said reactance winding in series with said one field coil in circuit with said network to vary the energization of said one field winding in response to variations in the energization of said control winding, whereby the effect on said motor of variations in the voltage of said network is amplified by said reactor.

7. In a system for maintaining the voltage of an alternating current network at a desired value, the combination of a dynamoelectric machine for varying said voltage, said machine having field winding means for controlling the voltage of said machine, a rotatable torque motor for controlling the energization of said field winding means, said motor having a pair of cooperating field coils for controlling the rotation of said motor, means connecting said field coils across said network to impress on said field coils voltages proportional to the voltage of said network, a saturable reactor having a control winding and a reactance winding, and means connecting said control winding in parallel with one of said field coils to vary the saturation of said reactor solely in response to variations in the value of the voltage across the terminals of said one field coil, means connecting said reactance winding in series with said one field coil in circuit with said network to vary the energization of said one field winding in response to variations in the energization of said control winding, whereby the effect on said motor of variations in the voltage of said network is amplified by said reactor.

References Cited in the file of this patent

UNITED STATES PATENTS

| Number | Name | Date |
|---|---|---|
| 2,477,991 | Lamm | Aug. 2, 1949 |
| 2,541,820 | Ker | Feb. 13, 1951 |
| 2,549,250 | Sikorra et al. | Apr. 17, 1951 |